United States Patent [19]

Whitehouse et al.

[11] Patent Number: 4,644,813

[45] Date of Patent: Feb. 24, 1987

[54] DRIVE MEANS FOR ROLLER DOOR

[75] Inventors: Martin H. Whitehouse, Northmead; Richard E. Jones, Carlingford, both of Australia

[73] Assignee: Byrne & Davidson Industries Limited, Revesby, Australia

[21] Appl. No.: 633,996

[22] Filed: Jul. 24, 1984

[30] Foreign Application Priority Data

Jul. 29, 1983 [AU] Australia .............................. PG0579

[51] Int. Cl.[4] .............................................. F16H 55/00

[52] U.S. Cl. ........................................ 74/431; 74/411; 160/309; 160/310; 464/157

[58] Field of Search ............... 160/310, 311, 309, 254, 160/331; 74/431, 411; 464/157, 182

[56] References Cited

U.S. PATENT DOCUMENTS

| | | | |
|---|---|---|---|
| Re. 31,793 | 1/1985 | Berman et al. | 160/309 |
| 1,656,715 | 1/1928 | Weiland | 464/157 |
| 1,858,867 | 5/1932 | Ulrich | 160/309 |
| 2,248,428 | 7/1941 | Kamenarovic | 464/157 |
| 2,742,769 | 4/1956 | Gleeson et al. | 464/157 |
| 3,285,089 | 11/1966 | Tsugawa | 160/133 |
| 3,884,050 | 5/1975 | Borcuk | 464/157 |
| 4,392,392 | 7/1983 | Perisic et al. | 160/310 |

FOREIGN PATENT DOCUMENTS

| | | | |
|---|---|---|---|
| 2325755 | 12/1974 | Fed. Rep. of Germany | 160/310 |
| 2497261 | 7/1982 | France | 160/311 |
| 2054735 | 2/1981 | United Kingdom | 160/310 |
| 525800 | 4/1973 | U.S.S.R. | 160/310 |

*Primary Examiner*—Leslie A. Braun
*Assistant Examiner*—Joseph M. Rolnicki
*Attorney, Agent, or Firm*—Pennie & Edmonds

[57] ABSTRACT

An improved roller door drive assembly comprising a drum, upon which a curtain is rolled, and a gear coaxially mounted to and engaged with the drum. The means of engagement consists of a plurality of forks projecting from the gear adapted to engage drum spokes. This arrangement prevents the ends of the drum while running in a swashplate manner from dragging the gear out of alignment with its driving pinion. In so doing this engagement means prevents excessive wear.

3 Claims, 7 Drawing Figures

DRIVE MEANS FOR ROLLER DOOR

The present invention relates to an improved means for driving roller doors.

Such doors are well known and comprise a flexible door curtain which can be raised and lowered from a drum located above the door aperture. It is well known to employ a pair of end drums rotatably mounted on a fixed axle extending horizontally across the top of the door aperture. The curtain is secured at its upper end to each of the spaced end drums and a ring gear is secured to one drum and provided with a motor drive for rotating the drums and thereby raising or lowering the door.

Difficulties have been encountered with previously known drive assemblies as a result of a combination of several factors: the light gauge pressed metal construction; the relatively large clearances and tolerances involved; the need to fixedly secure the ring gear to the drum and the customary use of a counter-balance spring extending between the drum and the axle. Not only is it awkward to bolt the ring gear to the drum in cases where the nuts are located within the drum assembly but the effect of the counter-balance spring frequently twists the end drum out of alignment. This makes it difficult to fix the bolts but, more importantly, causes the ring gear to run untrue, in the manner of a swashplate. These problems are particularly relevant when fitting a new power drive to an existing door or removing and replacing a power unit for servicing.

The present invention has been developed with a view to overcoming or at least substantially reducing the above mentioned difficulties with the prior art.

According to the invention there is provided a rolling door drive assembly of the type including a driven gear rotatable about an axis, a motor drive assembly for driving said driven gear, an end drum mounted coaxially to and driven by said driven gear, said end drum and said driven gear being coupled for conjoined rotation about said axis, by way of mutually interengageable drive formations for transmitting torque whilst permitting limited floating motion between said driving gear and said end drum.

A preferred embodiment of the invention will now be described, by way of example, with reference to the accompanying drawings in which.

Figure 3:
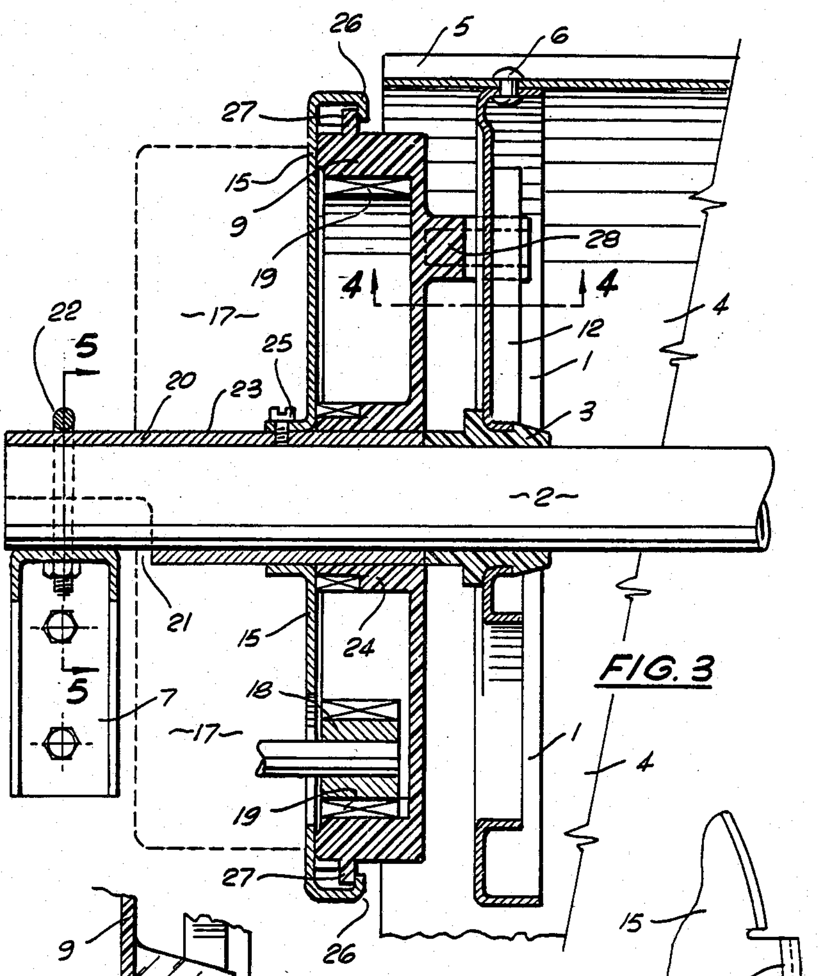
FIG. 3 is a view similar to FIG. 1 but illustrating a preferred embodiment of the present invention.
Figure 4:
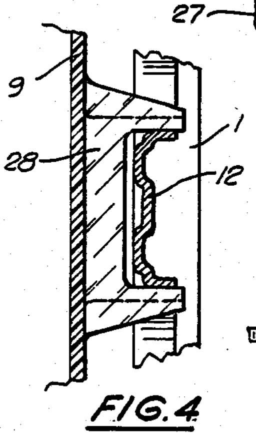
FIG. 4 is an enlarged section taken on line 4—4 of FIG. 3.
Figure 5:
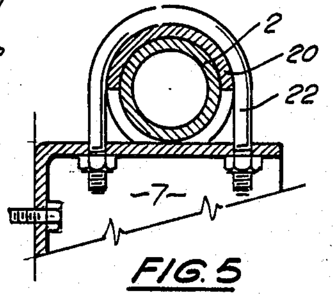
FIG. 5 is a section taken on line 5—5 of FIG. 3.
Figure 6:
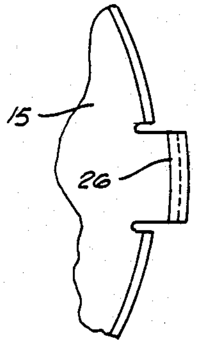
FIG. 6 is an end view of part of the end plate shown in FIG. 3.
Figure 7:
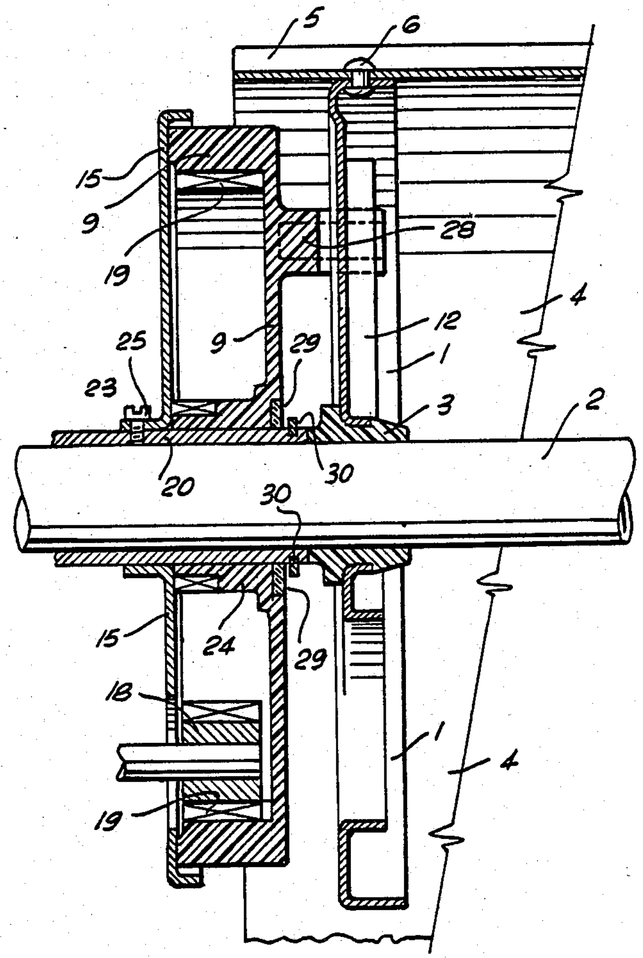

FIG. 7 repeats a portion of FIG. 3 except for showing a minor modification.

Figure 1:
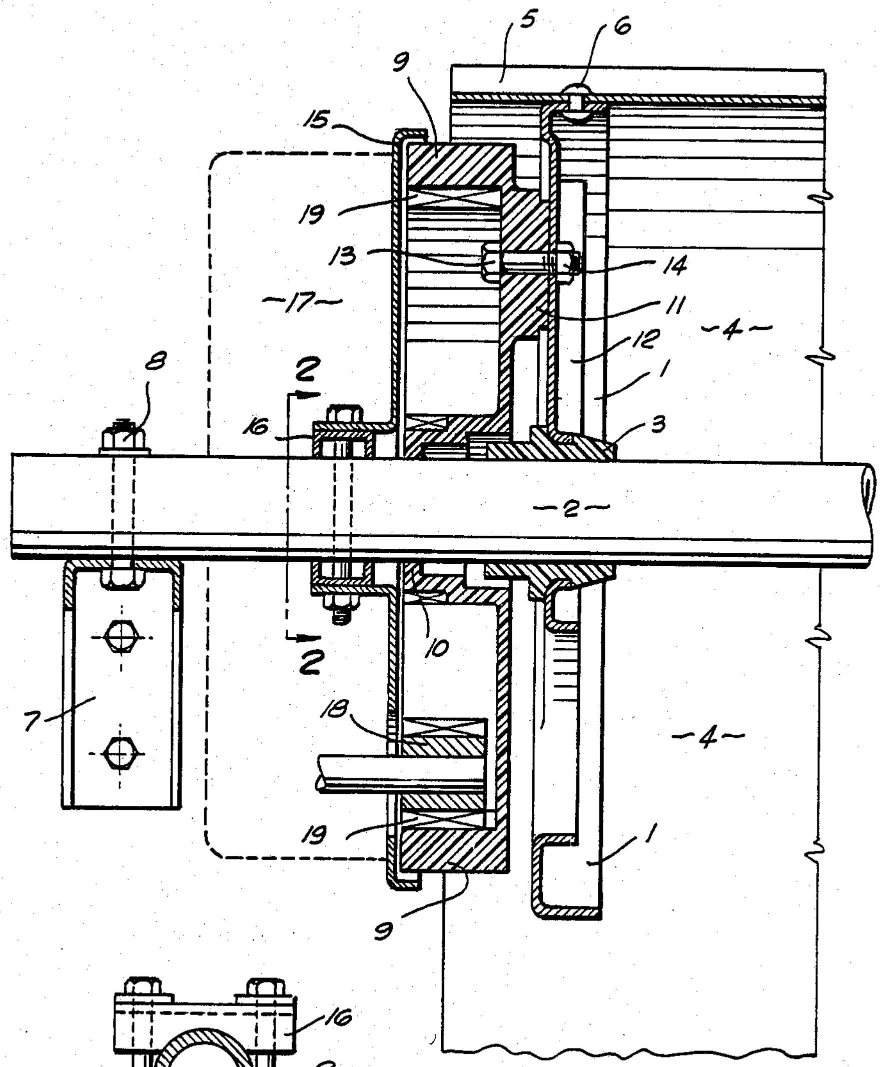
FIG. 1 Prior Art
FIG. 1 is a sectional side elevation of part of a prior art drive assembly.
Figure 2:
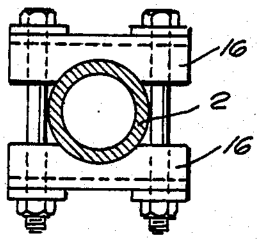
FIG. 2 Prior Art
FIG. 2 is a section taken on line 2—2 of FIG. 1.

Referring initially to FIGS. 1 and 2, it will be seen that a prior art drive assembly includes an end drum 1 formed of pressed sheet material and rotatably mounted about a fixed axle 2 by a plastics bush 3. An identical end drum (not shown) is located at the opposite end of the axle and the door curtain 4 is attached at its upper end 5 to both end drums 1 by rivets 6 or other securing means. The axle is commonly cut from steel tube stock and is fixedly attached to the door frame by means of a pair of opposite wall brackets 7 and mounting bolts 8.

A ring gear 9 is also mounted for rotation about the axle 2 along a short bearing surface 10. The ring gear is preferably moulded from plastics material and is provided with three projecting lugs 11 which are fixedly secured to spokes 12 on the end drum 1 by bolts 13 and nuts 14. An end plate 15 is rigidly attached to the axle 2 by clamp 16 and supports the motor drive assembly 17, shown dotted. The motor drive rotates the drum assembly by means of drive pinion 18 which engages an internal gear 19 on the ring gear.

The illustrated prior art is subject to the disabilities mentioned above and these have been substantially reduced by the preferred embodiment of the invention illustrated in FIGS. 3 to 6. Referring now to these drawings, corresponding reference numerals have been used to identify equivalent components which require no further description. In the improved drive assembly, however, a metallic sleeve 20 is placed over the axle 2 and provided with a cut-away portion 21 so that it may be rigidly secured to the axle by U-bolt 22. The outer surface 23 of the sleeve 20 forms a bearing for the ring gear which, in the illustrated embodiment of the invention, is provided with an enlarged bearing surface 24. This enlarged surface gives greater stability to the ring gear.

The end plate 15 is fixedly secured to the sleeve 20 by screws 25 or welding and includes a plurality of hooked flanges 26 which slidingly engage a peripheral flange 27 formed on the ring gear thereby to accurately position the ring gear. In the simplest form of construction, the flanges 26 are bent into position after the ring gear has been presented to the end plate. In other embodiments they may be formed and attached separately to the end plate.

In an alternative embodiment illustrated in FIG. 7 the hooked flanges 26 are omitted and the ring gear 9 is held in position by a washer 29 and circlip 30.

The ring gear is also provided with three forks 28 which engage corresponding spokes 12 on the end drum 1. Adequate clearance is provided between the forks and the ring gear spokes to allow for misalignment in the axial direction such that the system automatically accommodates any misalignment of the end drum by allowing the spokes to slide axially with respect to their adjacent ring gear fork as the drum rotates.

It will be appreciated that the above described embodiment of the invention provides a drive assembly in which the ring gear is both easily and accurately positioned and which automatically compensated for misalignment between the ring gear and end drum.

Although the invention has been described with reference to a specific example, it will be appreciated the invention may be embodied in many other form.

We claim:

1. A rolling door device assembly of the type including a driven gear rotatable about an axis, a motor drive assembly for driving said driven gear, an end drum mounted coaxially to and driven by said driven gear, said end drum having a plurality of spokes interengageable with at least one fork provided on said driven gear to couple said end drum and said driven gear for conjoined rotation about said axis and permit limited floating motion therebetween, said spokes being parallel with said fork in their region of engagement thereby to promote smooth sliding contact therebetween, a driven gear retaining means comprising a radially projecting peripheral flange on said driven gear and an end plate fixed with respect to said axis, said end plate having a plurality of hooked flanges extending therefrom the engage said peripheral flange for locating said driven gear against axial displacement relative to said motor driven assembly, and wherein said driven gear and said end drum are adapted to be mounted for rotation about a fixed axle defining said axis, a bearing sleeve, said driven gear being rotatably mounted to said bearing sleeve, said end plate being fixedly secured to said sleeve.

2. A rolling door drive assembly according to claim 1 wherein said sleeve has a cut-away portion for enabling said sleeve to be rigidly secured to said axle by at least one U-bolt.

3. A rolling door drive assembly according to claim 2 wherein said motor drive assembly is fixedly secured to said end plate.

* * * * *